US007903884B2

(12) United States Patent
Okubo et al.

(10) Patent No.: US 7,903,884 B2
(45) Date of Patent: Mar. 8, 2011

(54) SYSTEM AND COMPUTER SOFTWARE PROGRAM FOR VISIBLY PROCESSING AN OBSERVED INFORMATION'S RELATIONSHIP WITH KNOWLEDGE ACCUMULATIONS

(75) Inventors: Kousaku Okubo, Mishima (JP); Takuro Tamura, Mishima (JP)

(73) Assignee: BITS Kabushikigaisha (JP)

( * ) Notice: Subject to any disclaimer, the term of this patent is extended or adjusted under 35 U.S.C. 154(b) by 1061 days.

(21) Appl. No.: 11/039,176

(22) Filed: Jan. 20, 2005

(65) Prior Publication Data

US 2005/0203889 A1    Sep. 15, 2005

(30) Foreign Application Priority Data

Mar. 15, 2004  (JP) ................................. 2004-073614

(51) Int. Cl.
*G06K 9/72* (2006.01)
*G06F 7/00* (2006.01)
(52) U.S. Cl. ......... 382/229; 707/723; 707/724; 707/728; 707/729; 707/730
(58) Field of Classification Search .............. 707/3, 723, 707/724, 728–730; 382/229
See application file for complete search history.

(56) References Cited

U.S. PATENT DOCUMENTS

| 5,301,109 | A  | * | 4/1994  | Landauer et al. ............ 704/9   |
| 7,117,223 | B2 | * | 10/2006 | Koizumi et al. ............ 707/102  |
| 7,225,180 | B2 | * | 5/2007  | Donaldson et al. ............ 707/3  |
| 2002/0184201 | A1 | * | 12/2002 | Yatsuzuka et al. ............ 707/3  |
| 2003/0130994 | A1 | * | 7/2003  | Singh et al. ............ 707/3      |
| 2003/0208502 | A1 | * | 11/2003 | Lin ............ 707/101              |

FOREIGN PATENT DOCUMENTS

JP      11-134363       5/1999
JP      2003-330966     11/2003

OTHER PUBLICATIONS

Yoshihiro Noguchi et al, Development of Home Page Knowledge Retrieval Systems Implementing Retrieval-type Navigations, Essays of Information Symposium, Dec. 5, 1996 p. 91-98, vol. 96, No. 11. Information Processing Society of Japan, Tokyo.
Thomas K Landauer, Peter W. Foltz, Darrell Laham, "An Introduction to Latent Semantic Analysis" 1998.
Gerald Salton and Christopher Buckley, "Term-Weighting Approaches in Automatic Text Retrieval" 1988.
Marti A. Hearst, "TileBars: Visualization of Term Distribution Information in Full Text Information Access", CHI 1995, Denver, CO, May 1995.

* cited by examiner

*Primary Examiner* — Vu Le
*Assistant Examiner* — Soo Jin Park
(74) *Attorney, Agent, or Firm* — Pepper Hamilton LLP (57) ABSTRACT

A system for visibly processing observed information may include a configuration for systematizing information; a knowledge accumulation housing unit for storing knowledge accumulations from knowledge information belonging to each such configuration; an observed information receiving unit for receiving, from a user, information observed by the user; a fixed quantity processing unit for assigning a fixed quantity to a relationship between the observed information and the knowledge information belonging to each configuration for the knowledge accumulations; and a fixed quantity value display processing unit for displaying a numerical value of the fixed quantity, in accordance with the fixed quantity processing unit, together with its relationship with each configuration of the knowledge accumulations.

11 Claims, 11 Drawing Sheets

| Term | TF-IDF value |
|---|---|
| encoding | 1 |
| inner segment | 9 |
| integration | 5 |
| isoform | 2 |
| photoreceptor | 6 |
| potential | 4 |
| retina | 5 |
| retinitis | 7 |
| retinitis pigmentosa | 7 |
| rod | 7 |
| rod cell | 8 |
| segment | 5 |
| usher disease / syndrome | 7 |
| candidate gene | 5 |
| cascade | 5 |
| cell | 3 |

SYSTEM AND COMPUTER SOFTWARE PROGRAM FOR VISIBLY PROCESSING AN OBSERVED INFORMATION'S RELATIONSHIP WITH KNOWLEDGE ACCUMULATIONS

CROSS-REFERENCE TO RELATED APPLICATIONS

This application claims the benefit of Japanese Patent Application No. 2004-073614 by the present inventors entitled "A System and Computer Software Program For Visibly Processing an Observed Information's Relationship With Knowledge Accumulations", filed on Mar. 15, 2004.

FIELD OF THE INVENTION

The present invention relates generally to information processing means and more particularly, to a system for visibly processing information observed by a user.

BACKGROUND OF THE INVENTION

In recent years, due to the general public use of personal computers and their electronic information, as well as the widespread use of the Internet and the consequent multiplicative effect of the circulation of information, the amount of information to be processed has increased explosively.

The same can be said for inventions in measurement technologies in the biotechnology field, as well as inventions from developments in the scientific technologies.

In the past, various information handling means involving interpreting such information and extracting promising information have been accomplished. Such means include, depending on developing fixed quantities for the relations between the elements that make-up the information (information objects), searching for such relational information objects, classification of the information objects, and the extraction and collection of information objects.

Examples of these information processing means include the Internet searching service "google" (www.google.com), or genetic classifications according to the clustering of gene expression frequency information in the biotechnology field.

For a long time, there has been a method using a dictionary as an information processing means for the interpretation of information. In other words, it is a means for using information prepared beforehand that correspond to individual information objects, and an example of such an application would be computerized language translation.

Information handling means for using the fixed quantities of relations among information objects have vagueness, in the possibility of easy application in various fields, in terms of the information produced from such applications.

In the extraction of characteristics for expressing the collection of information objects pertaining to the information being analyzed, the results become controlled by the nature of the information.

Regarding methods using dictionaries, in order to get with certainty the aimed for information, it is also difficult to use dictionaries suited for these various different purposes.

Additionally, it is noted that the following patent literature exists which is related to the present invention: Japanese Patent Laid-Open No. 2003-330966, although this reference does not negate the novelty or inventiveness of the present invention.

SUMMARY OF THE INVENTION

An embodiment of the present invention provides for the visible display of the fixed quantities of connections between observed information and systematically accumulated knowledge. A system for visibly processing observed information has a configuration for systematizing information; a knowledge accumulation housing unit for storing knowledge accumulations from knowledge information belonging to each such configuration; an observed information receiving unit for receiving, from a user, information observed by the user; a fixed quantity processing unit for assigning a fixed quantity to a relationship between the observed information and the knowledge information belonging to each configuration for the knowledge accumulations; and a fixed quantity value display processing unit for displaying a numerical value of the fixed quantity, in accordance with the fixed quantity processing unit, together with its relationship with each configuration of the knowledge accumulations.

It is embodied in another mode of the invention an article for visibly processing observed information based on a configuration for systematizing information and knowledge accumulations from knowledge information belonging to each such configuration, having a computer readable medium having instructions stored thereon which when executed causes a knowledge accumulation housing unit to store the knowledge accumulations; an observed information receiving unit to receive, from a user, information observed by the user; a fixed quantity processing unit to assign a fixed quantity to a relationship between the observed information and the knowledge information belonging to each configuration for the knowledge accumulations; and a fixed quantity value display processing unit to display a numerical value of the fixed quantity, in accordance with the fixed quantity processing unit, together with its relationship with each configuration of the knowledge accumulations.

BRIEF DESCRIPTION OF THE FIGURES

A fuller understanding of the present invention will become apparent to one skilled in the art, by referring to the following description taken in connection with the accompanying drawings, in which.

DETAILED DESCRIPTION OF THE INVENTION

As mentioned above, the present invention provides a system for providing the visible display of the fixed quantities of relationships between observed information and systematically accumulated knowledge.

As an example, a book can be used with such a configuration, where "a part of the book" (book element) can be an information unit. In the systematic collection of the knowledge accumulations, the fixed quantities of the relationships with an observed information can be accomplished, and the results of the connections with the elements making up the book, such as with the Table of Contents, can be visibly presented.

In the example where the knowledge accumulation item is a book, the above configuration would name the fixed sections of the contents that make-up the book such as page, chapter, paragraph, chronological table, footnotes of figures and tables, character count/word count/time.

In other words, one can develop fixed quantities for the relationships between those configurations and the observed information. For example, these numerical values can be used as one basis, and the locations of the book elements in the book can be used as another basis, in a graphic representation. In this way, it becomes possible to use the knowledge configuration gathered by the author or editor of the book, to interpret the information.

As another example, a textbook can be used as the book. It becomes possible to know which part of the "systematically gathered knowledge within the course of study" collected in the textbook relates to the observed information object.

Accordingly, it becomes also possible to visually show the results of this information analysis.

One embodiment for executing the present invention is concretely explained below, with reference to the accompanying drawings.

Figure 1:
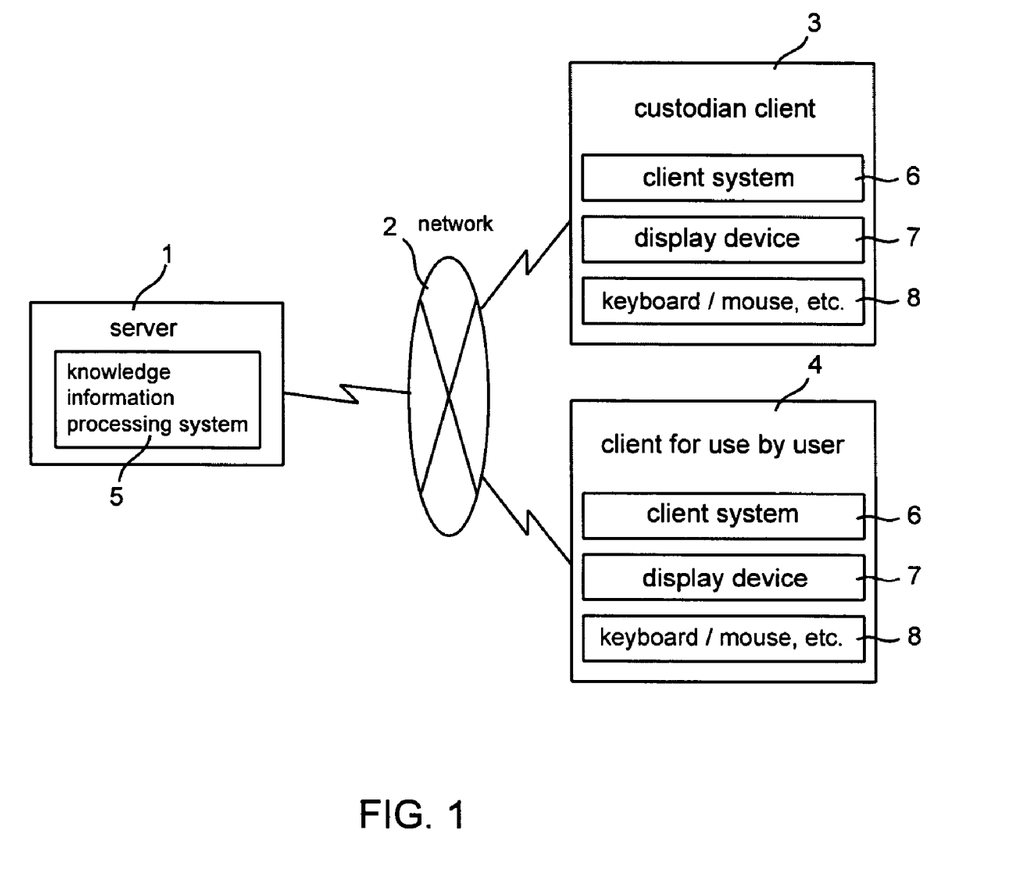
FIG. 1 shows a system configuration schematic diagram related to one embodiment of the present invention.

FIG. 1 is a total block diagram showing an application configuration of a system in accordance with the present embodiment.

This example shows a server 1 installed in a system in accordance with the present invention. A network 2 comprising a LAN or internet network and the like, intervenes with the server 1, and a custodian client 3 as well as a client for use by a user 4 are also arranged.

Computerized book data, document element data, and vocabulary (term) dictionaries are read into the server 1. A knowledge information processing system 5 for outputting the results of statistical calculations of a document element X term matrix are arranged on server 1.

The above clients 3 and 4 communicate with the server 1 by way of the network 2. A client system 6 to provide a user interface (Web browser) for operating the processing system 5, a display device 7 for displaying the user interface, as well as a keyboard/mouse, etc. 8 for providing a user interface for use by the custodian are arranged.

Figure 2:
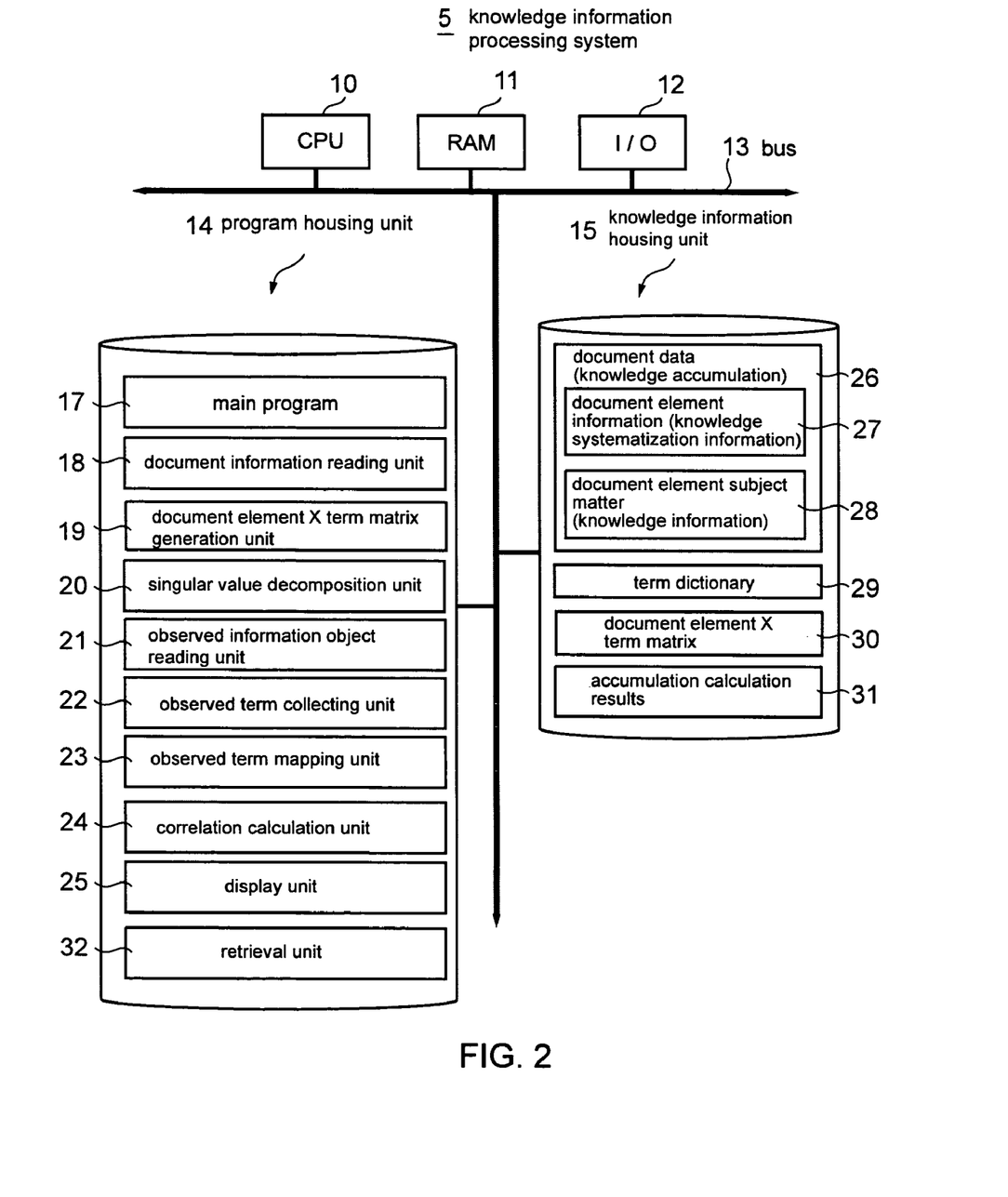
FIG. 2 illustrates a block diagram showing the knowledge information processing system.

FIG. 2 is a detailed block diagram showing the knowledge information processing system 5. Regarding this server, a CPU 10, RAM 11, I/O interface 12 are connected to a bus 13, and a program housing unit 14 as well as a housing unit 15 for the above-mentioned knowledge information are also connected.

Stored within the program housing unit 14 are: an OS-type main program (and/or other programs) 17, items related to the main points of the present invention such as a document information reading unit 18, a document element X term matrix generation unit 19, a singular value decomposition unit 20, an observed information object reading unit 21, an observed term collecting unit 22, an observed term mapping unit 23, a correlation calculation unit 24, a display unit 25 and a knowledge information retrieval unit 32.

Stored within the knowledge information housing unit 15 are: the document data 26 which is the knowledge accumulation of the present invention, a term dictionary 29, the document element X term matrix 30 and the accumulation calculation results 31.

The above-mentioned document data 26 has document element information (page, chapter, paragraph, footnotes of charts) 27 as systematized information and document element subject matter (contents of the page, chapter, paragraph, footnotes of charts) 28 as knowledge information.

The document element subject matter may be index vocabulary that is related to the various pages. The index vocabulary may be important technical terms carefully selected from the contents of the pages.

Each component 17-31 comprises a fixed area of the memory media of the hard disk etc., or comprises a software program installed in such an area. They comprise and function as the various components of the present invention, by being called to be carried out on the suitable RAM 11 by the CPU 10.

Figure 3:
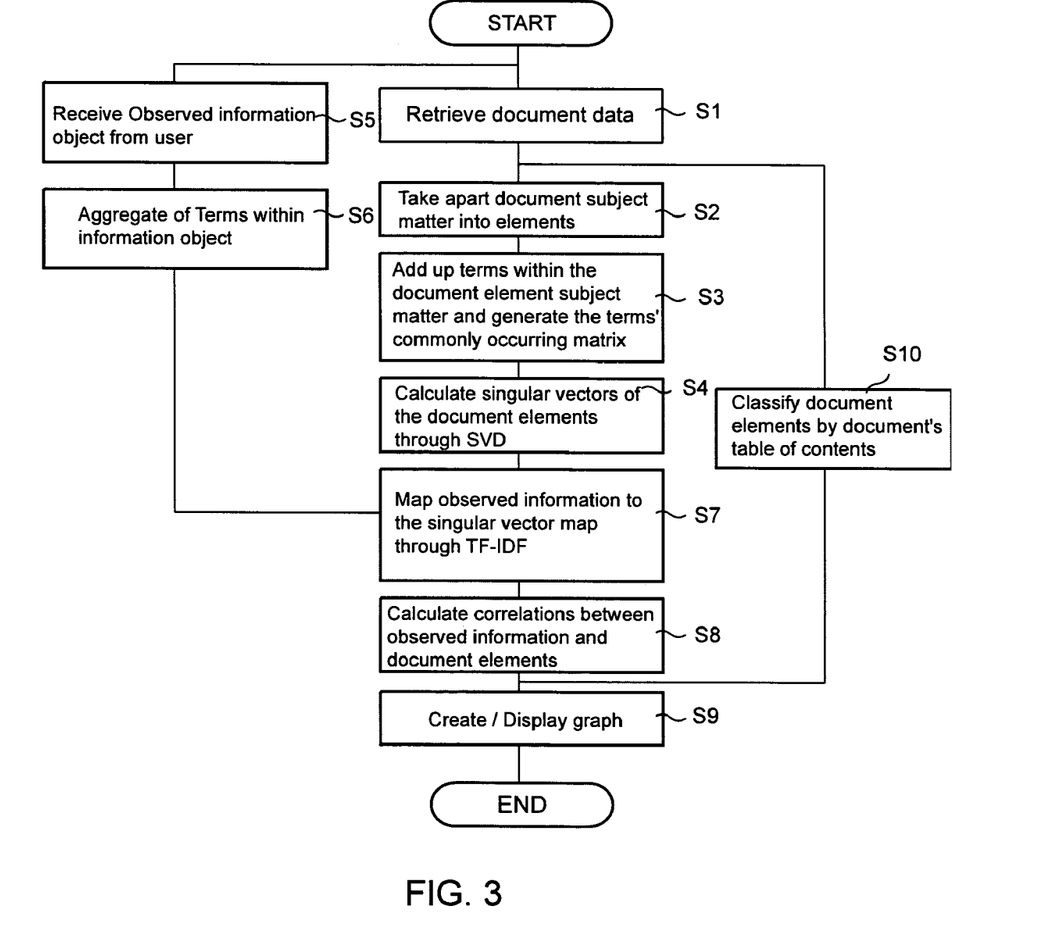
FIG. 3 illustrates a flowchart showing the processing process of the present embodiment.

The detailed configurations and functions of each component are explained by following the concrete actions shown in the flowchart of FIG. 3.

As a means for making fixed quantities of the associations among information objects, this embodiment shows an exemplary usage of a technique shown in Latent Semantic Analysis (LSI: Landauer, T. K. et al. (1998) Introduction to Latent Semantic Analysis. Discourse Processes, 25, 2590284) (The relevant entries in this literature are incorporated herein by this reference.)

In other words, this embodiment makes use of the statistics of common vocabularies (terms) existing in the texts which are the substance of information objects, or in texts accompanying the information objects, for making fixed quantities of the relationships among information objects.

At first, the document information reading unit 18 reads the computerized document data 26 into the RAM 11 and develops it (step S1). The document element subject matter is taken apart into the document elements consisting of pages, chapters, paragraphs, chart footnotes and the like (step S2).

Then, the document element X term matrix generation unit 19 generates the document element X term matrix, by regarding the concerned document data as one document information object, and then adding up the types and quantities of the terms included in the document element subject matter (step S3).

In order to improve accuracy, this embodiment makes use of the dictionary-like storing of the above-mentioned terms in a term dictionary 29. Using the terms included in this term dictionary 29 as the basis, a document element X term matrix 30 is generated and stored in the knowledge information housing unit 15.

Next, the singular value decomposition unit 20 accomplishes the singular value decomposition (SVD) of the matrix 30 to find the singular values of the document elements and terms. From this, the singular values and the associated singular vectors (singular coordinate system) are calculated (step S4).

In other words, where the document element is the case consisting of m chapter (element), and the term is a variable value consisting of n word (element), X is decided to be the case X variable value consisting of line m, column n.

The ranking is done as r, and S is the diagonal matrix of the diagonal elements $\lambda 1, \lambda 2, \ldots \lambda r$ ($\lambda 1 \geqq \pi 2 \geqq \ldots \lambda r \geqq 0$). U, V is the matrix having the regular straight line vector as the line vector. Then, the matrix X can be taken apart as X=USVT.

Here, S is line r, column r of the diagonal matrix, U is line m, column r having the column that runs straight through that, and V is column n, line r having the column that runs straight through that. At this point, the matrix US is sought. The lines at matrix US correspond to the document elements.

In other words, it becomes possible to calculate the correlations among the documents elements by having the columns of matrix US as the explanatory variables.

Additionally, as discussed above, the term dictionary (controlled vocabulary) previously prepared according to the intended objective is used for calculating the types and quantities of terms in the information objects. In this manner, it is possible to realize a matrix US having a high resolution in relation to the intended objectives.

Next, the observed information object reading unit 21 accepts the input of the information object observed by the user and reads it into the RAM 11 (step S5). This information object is information that the user wants to observe, such as for example a "specific gene"

Next, the observed term collecting unit 22 collects the types and quantities of terms included in the text comprising the relevant observed information objects (step S6). For this collection process, the term dictionary 29 need not be used.

The reason is because, for example, even if the types and amounts of all words (verbs, nouns, adjectives) are collected, during the later processing of the mapping, only the terms that are the same as the document element terms extracted by the document element X term matrix generation unit 19 will be used.

Next, the results collected by the observed term collecting unit 22 is mapped, by the observed term mapping unit 23, to the space which is the same as the matrix US (step S7). This is accomplished using the technique disclosed by Term Frequency-Inverse Document Frequency Weighting (TF-IDF: Gerard Salton et al. Term-weighting approaches in automatic text retrieval, Information Processing and Management: an International Journal, v.24 n.5, p. 513-523, 1988).

Through this mapping process, it becomes possible for the correlation calculation unit 24 to calculate the correlations among the observed information objects and the document elements. As a means of calculating those correlations, in this practical example, cosine correlation is used (step S8).

From the above, upon seeking the correlations among the observed information objects and the document elements, the above-mentioned display unit 25 displays in graph form the correlative numerical value as one variable value, and the location of the document element in the document composition as the other variable value (step S9).

Additionally, it is efficient to use for the graph, the acquired information which is related to the document composition, positioned by the document elements at the table of contents (step S10).

The above system as well as its handling related to knowledge accumulation/documents will be explained in a sample case, where the textbook "Anatomy and Physiology, 5$^{th}$ Edition" is used as the knowledge accumulation/book and the below information as the observed information object, as follows:

Gene Database: RefSeq Database of NCBI (U.S. Bio Information Technology Research Institute) (Each entry is equivalent to 1 document. About 20,000 total number of documents.)

Gene ID (gene object): NM_002597 Gene Definitions: Homo sapiens phosducin (PDC), transcript variant 1, mRNA.

The Text Explaining the Gene: Summary: This gene encodes a phosphoprotein, which is located in the outer and inner segments of the rod cells in the retina. This protein may participate in the regulation of visual phototransduction or in the integration of photoreceptor metabolism. It modulates the phototransduction cascade by interacting with the beta and gamma subunits of the retinal G-protein transducin. This gene is a potential candidate gene for retinitis pigmentosa and Usher syndrome type II. Alternatively spliced transcript variants encoding different isoforms have been identified.

For this textbook, in order to improve accuracy, a term dictionary 29 in the technical field of the textbook is used. A document element X term matrix 30 is generated based on terms included in this term dictionary 29. On the other hand, the observed term collecting unit 22 will extract and collect terms from text included in the observed information object. Among those terms, only terms which are the same as in the term dictionary 29 will be used for the later calculations of correlations In this observed information object, the underlining of those terms would result in the following:

Summary: This gene encodes a phosphoprotein, which is located in the outer and innersegments of the rodcells in the retina. This protein may participate in the regulation of visual phototransduction or in the integration of photoreceptor metabolism. It modulates the phototransduction cascade by interacting with the beta and gamma subunits of the retinal G-protein transducin. This gene is a potentialcandidategene for retinitispigmentosa and Ushersyndrome type II. Alternatively spliced transcript variants encoding different isoforms have been identified.

Next, the above-mentioned correlation calculation unit 24 calculates the TF-ID numerical values of the terms within the above-mentioned information object.

The TF-IDF is, as mentioned above, an abbreviation which stands for Term Frequency-Inverse Document Frequency. It is a type of document vector which calculates in order to develop document abstracts or add document characteristics.

It is a calculation in which scores are assigned to terms contained within documents, and vectors and made with those scores. These are compared with the frequency of the terms within the documents and proportionately increased, then decreased according to the ratio of documents having those terms (please refer to the method as follows).

frequency of the subject term within the subject document X log (total number of documents)/number of documents containing the term In other words, if the term is one which appears in documents only a few times (rare term), the score is high. Furthermore, the score increases and decreases depending on the number of times that that term is contained in a document.

Figure 4:
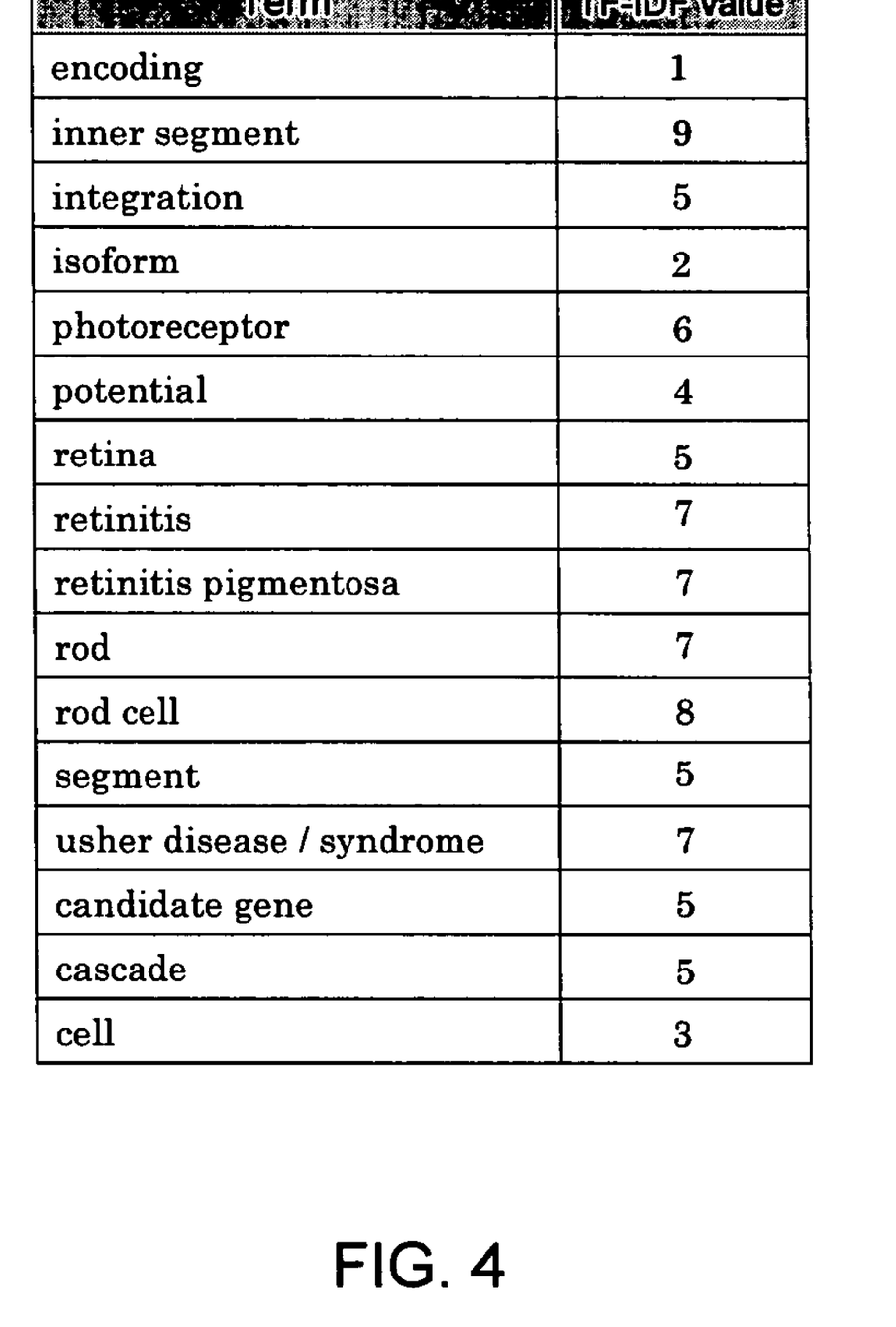
FIG. 4 shows an exemplary table of TF-IDF values for terms included in an observed information object.

For this example, the IDF calculates all entries of the RefSeq Database, and the result is as shown in FIG. 4.

Next, the observed term mapping unit 23 maps this result to the space which is the same as matrix US. As described above, the column at matrix US sought by the singular value decomposition expresses the document element vector. However, the column at matrix SV appears to be the vector of the term having the same space as matrix US.

Thus, the vectors for each term which have been mapped to the observed object is weighted through TF-IDF numerical values and then added, and they become the vector of the observed objects. Then, in accordance with looking for the correlation value (cosine) between the vector of the observed object and the document element vector, a fixed value is assigned for the relationships between the observed object's vector and the document element.

Figure 5:
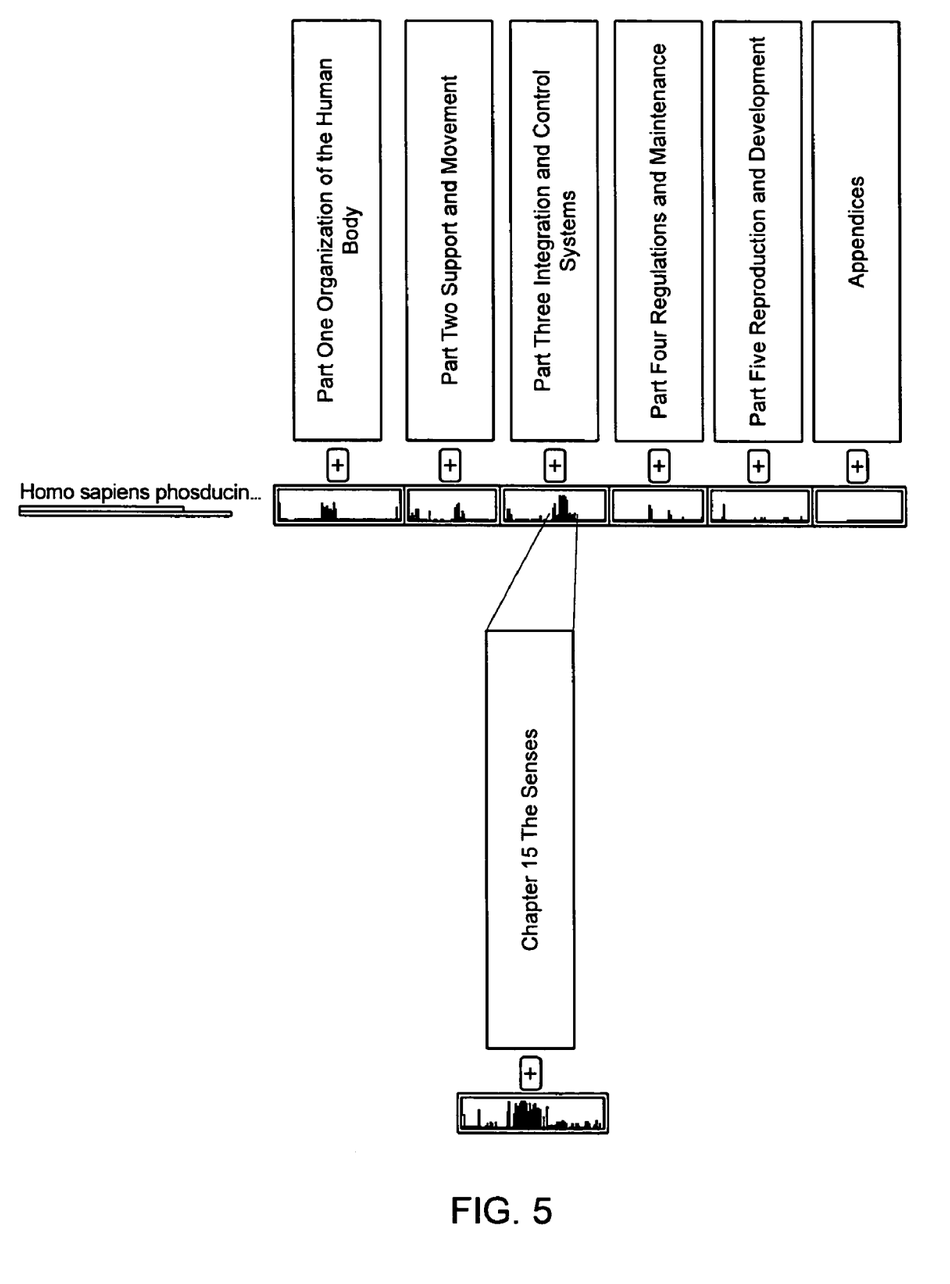
FIG. 5 shows a diagram of an exemplary processing/results display according to one embodiment of the present invention.

FIG. 5 shows a graphical representation of the fixed values of the relationships between the observed object and the pages which make up the textbook, "Anatomy and Physiology, 5th Edition". From the graph, it can be comprehended that there is a connection between the observed object (gene ID: NM_002597) and Integration and Control System and, when observed in more detail, a connection between the observed object and Senses.

Also, as another practical example, there is a case where pages from textbooks in the medical/biological field are used as document elements, and terms included in the indexes of those documents are used for a term dictionary. With SVD (singular value decomposition), and with rank r=50, it can be observed that the characteristics of the document element X term matrix are maintained.

Additionally, it is observed that at rank r=200, the characteristics of the document element X term matrix are maintained even better.

The columns of matrix VS obtained from the results of singular value decomposition correspond with the terms, and it becomes possible for the document elements and terms to be placed in the same spaces. By making the columns of the matrix VS explanatory variable values, it also becomes possible to calculate the correlations among the terms and among the terms and the document elements.

In other words, in the case where the observed information object is the term itself, it becomes possible to calculate the correlation with the document elements without executing TF-ID, and then graphically represent those results.

FIG. 5 shows a graphical representation of the fixed values of the relationships between the observed object and the pages which make up the textbook, "Anatomy and Physiology, $5^{th}$ Edition". From the graph, it can be comprehended whether that there is a connection between the observed object (gene ID: NM_002597) and Integration and Control System and, when observed in more detail, a connection between the observed object and Senses.

Additionally, although the above description allows the searching of terms and document elements having high correlations by viewing the graph, accomplishing this in an automated fashion is of course also possible. For example, it may be good to have the above-mentioned retrieval unit 32 specify the document elements having the highest total correlation values with the information object.

Furthermore, the areas of the graph may be used to sum up the extent of the correlations.

It is also possible to use the same process as above with a plurality of documents. With the same method, one can then have the above-mentioned retrieval unit 32 search for the documents as well as the locations within the documents having the highest correlations with the observed information objects.

Figure 6:
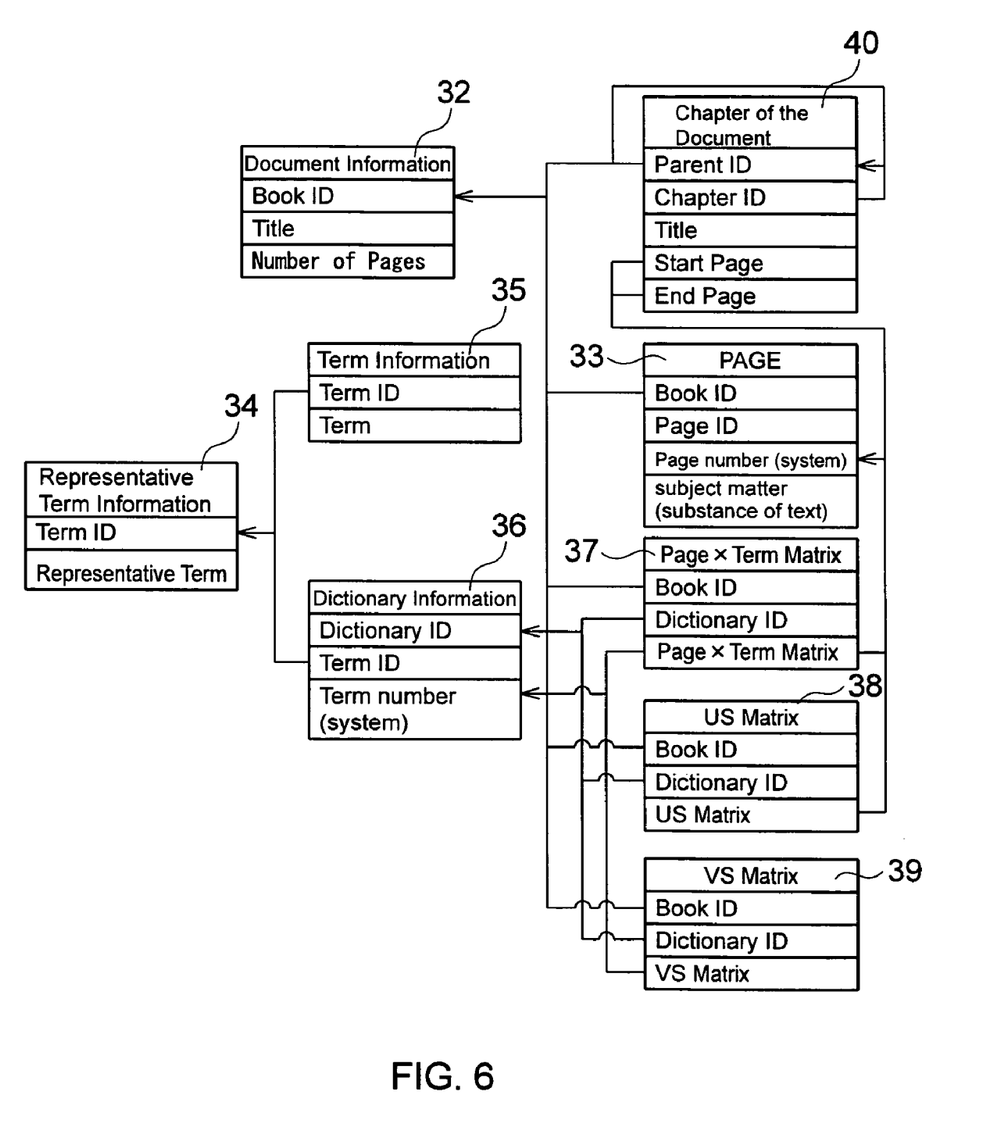
FIG. 6 shows an exemplary database configuration according to one embodiment.

FIG. 6 shows an outline schema for the case of a configuration where the information used in the present invention is stored in the knowledge information housing unit and a relationship database is used. Based on this, the characteristics of suitable information processed by the present system will be explained.

A "page" of the document is used as the unit of the document element here.

The document information table 32 includes the book ID, which is the master ID with regard to the document information, the title of the document, and the number of pages. The page table 33 stores information with regard to the pages making up the document (systemization information), and includes the book ID, the page ID which is the master ID of the page information, the page number which shows the order of pages within the document, and the text information included within the page (knowledge information).

The page number is considered to be used as the column or row number of the various matrices, and it is assumed to house series of integers given by the system. Additionally, the text information may be a collection of index terms provided with their connections to the page numbers.

The representative term table 34 includes the term IDs, which are the master IDs of the terms, and the representative terms. In this table, the term ID is a unique ID. When displaying the term information based on the term ID, the representative term is used as the title.

The term table 35 houses terms that include synonyms, along with the terms that they belong to. When adding up the terms in the text information, matching is accomplished of the terms included in the term table, and the summing is done according to the term IDs.

The dictionary information table 36 houses the dictionary ID which is the master ID of the dictionary information, the term IDs which show the terms belonging to the dictionary, and the term numbers which are the addresses of the terms in the dictionary.

The term number is considered to be used as the column or row number of the various matrices, and it is assumed to house series of integers given by the system.

The page X term matrix table 37 houses the book ID and the dictionary ID, and specifies the dictionary which is the collection of terms and the document which is the object of the matrix calculations.

In the page X term matrix, the column corresponds to the page number and the row corresponds to the term number. For the page X term matrix, the number of elements becomes huge.

In using the page X term matrix of this system, due to the need to process a wide range, when formalizing information, it becomes impossible to realistically process with the combination of the present state computers and DBMS. Therefore, the whole matrix is considered as one data, or the reference of the matrix data, housed in the file system, is housed in the field.

Additionally, the spaces at the page X term matrix is usually huge. However, because of sparse, when the whole matrix is considered as one data and housed within the database, by housing the sparse matrix form, it becomes possible to reduce data capacity and speed up the input/output.

The US matrix 38 houses the book ID and the dictionary ID, and specifies the document which is the object of the matrix calculations and the dictionary which is the collection of terms.

In the US matrix, the column corresponds to the page number, and the row corresponds to the rank of the singular vector.

At the US matrix, the matrix size also becomes huge. Thus, the database according to the formalized matrix data is not housed. Rather, the whole matrix is considered as one data, or the reference of the matrix data, housed in the file system, is housed in the field.

The VS matrix 39 houses the book ID and the dictionary ID, and specifies the document which is the object of the matrix calculations and the dictionary which is the collection of terms.

In the VS matrix, the column corresponds to the term number, and the row corresponds to the rank of the singular vector.

Again at the VX matrix, the matrix size becomes huge. Again, the database according to the formalized matrix data is not housed. Rather, the whole matrix is considered as one data, or the reference of the matrix data, housed in the file system, is housed in the field.

The chapter table 40 of the document houses the classification of the chapter configuration as the collection of the document's chapters. Thus, it is made possible to use additional information in the form of a displayed graph based on the document configuration.

The chapter table of the document houses the book ID or the chapter ID, and a parent ID specifying a group superior to the page collection.

The chapter ID which is the master ID of the document's chapter data, the title of the chapter, the start pages of the chapters in the document, and the end pages are stored. At the start pages and the end pages, the page numbers are stored.

As a means of using the chapter table of the document, chapters of interest are collected from a plurality of books. Then, a virtual document is made, and visualization of the information is accomplished.

Figure 7:
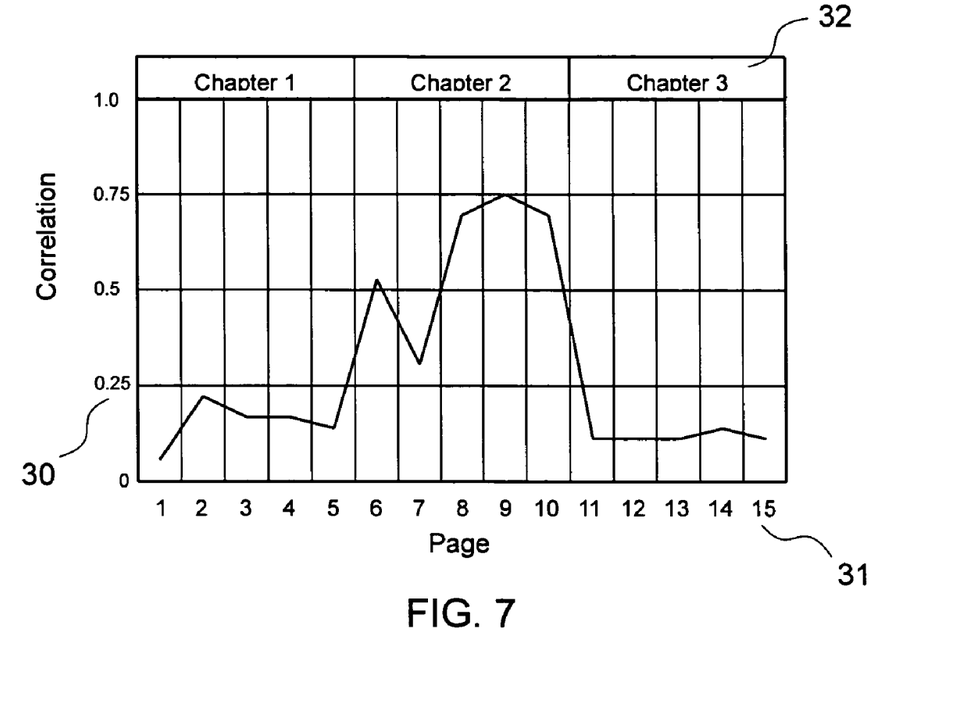
FIG. 7 illustrates a graph exemplifying the visualization of relationships between information objects and book elements.

FIG. 7 shows an example of the graphical display of the correlation between the observed object and the document elements.

This figure is a broken-line graph which, after calculating the correlation between the observed object and the pages which are the document elements, has the correlation numerical value as one axis 30 and the pages following the document configuration as the other axis 41.

It is efficient to display 42 information as the document configuration (such as the chapter titles) that is related to the document configuration and acquired from the table of contents.

Figure 8:
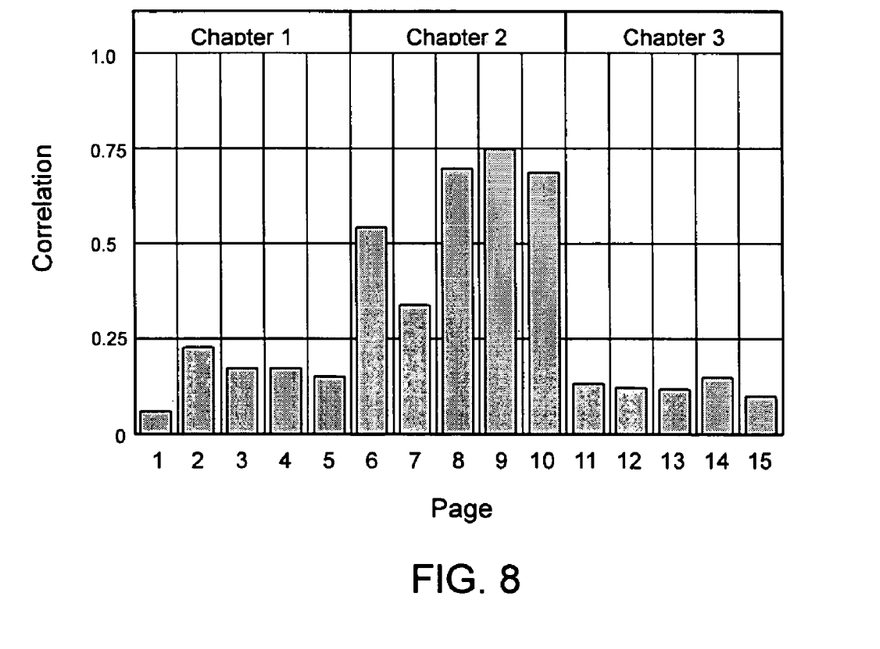
FIG. 8 illustrates a bar graph exemplifying the visualization of relationships between information objects and book elements.
Figure 9:
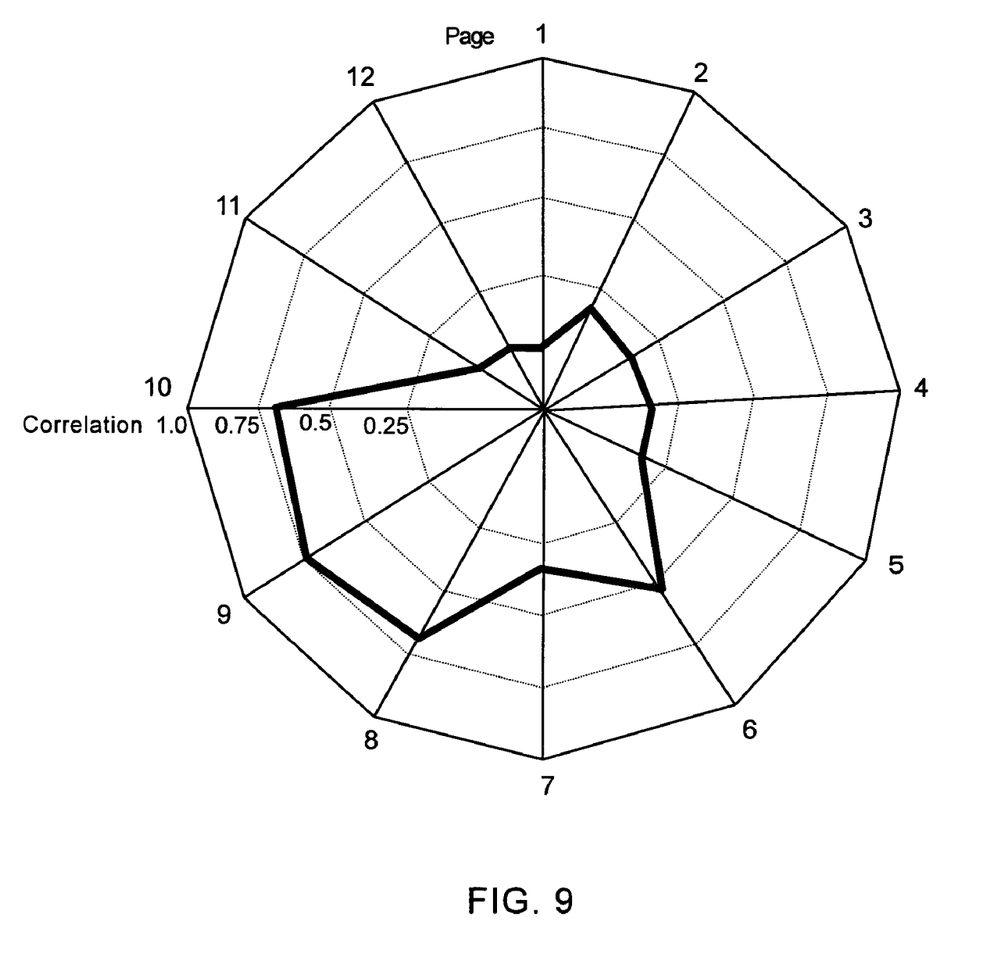
FIG. 9 illustrates a radar graph exemplifying the visualization of relationships between information objects and book elements.
Figure 10:
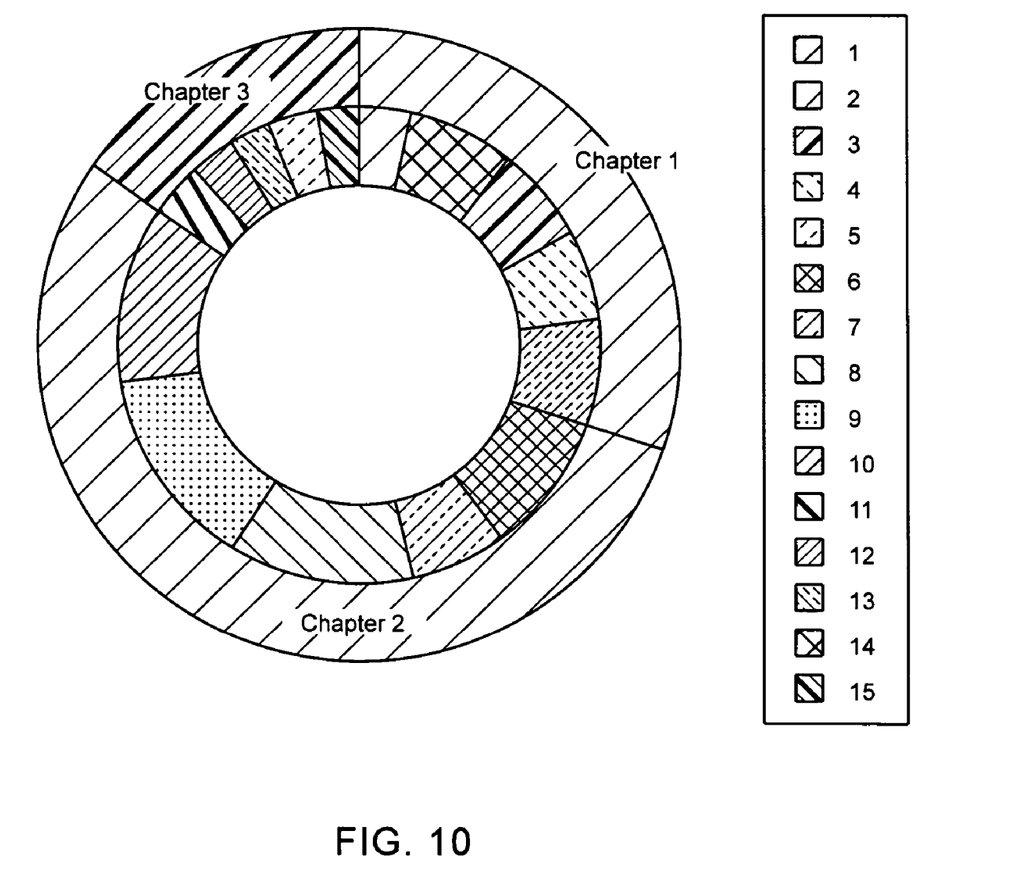
FIG. 10 illustrates a doughnut graph exemplifying the visualization of relationships between information objects and book elements.

Similarly, it is also possible to display graphs such as a bar graph (FIG. 8) having the correlation numerical value as one axis and the document elements following the document configuration as the other axis; a radar graph (FIG. 9) having the document elements as the direction and the correlation numerical value as the distance from the center; and a pie chart or a doughnut graph (FIG. 10) having the correlation numerical value of each document element as the occupying angle.

The present invention can have as the observed information object information configured by text or information having text configuration optionally attached to it, such as a term, a person's name, an article, a scientific paper, a grant application, a biomolecule, or a phenotype.

Again, the object of the knowledge accumulation is not limited to textbooks or dictionaries. It can also be any gathering of text information configured and written/compiled according to the intentions of the author/editor, such as a map, a newspaper, an essay, a grant application, a Web site, or a panel discussion.

For example, in the application of a textbook as the document, many textbooks have the systematization of knowledge, hierarchization, and classification in their subject fields. In displaying the information according to such a configuration, it then becomes possible to get the knowledge hierarchy/classification related to the observed information.

Figure 11A:
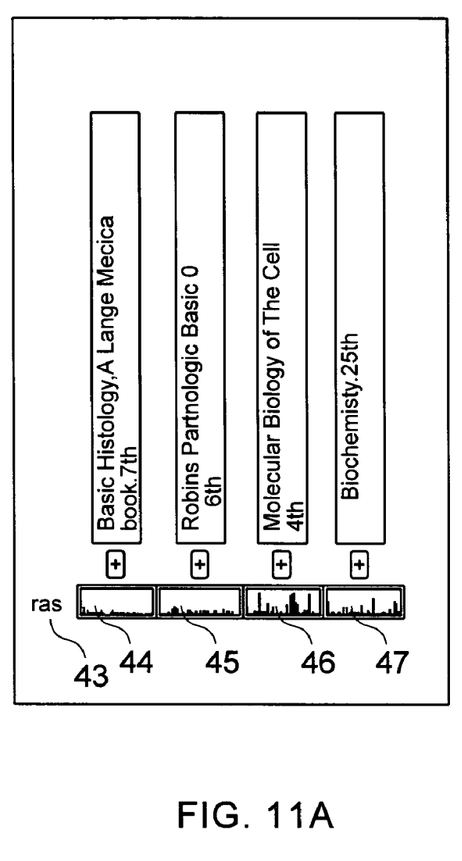
FIGS. 11A and B illustrate an exemplary diagram showing the visualization of relationships between information objects and book elements.
Figure 11B:
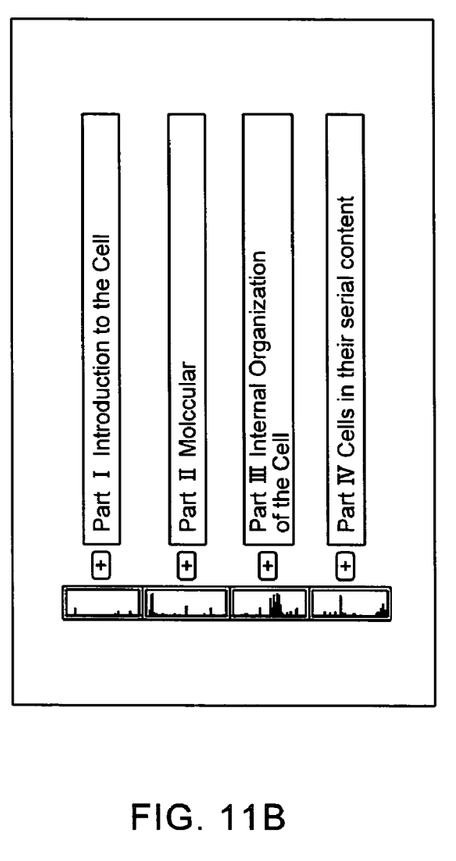

FIGS. 11A and B show other examples of graphing the correlations of observed information objects for a number of documents.

FIG. 11A displays a bar graph of the correlations among the page units of four books 44-47 for the observed information object ras 43. Additionally, FIG. 11B displays a bar graph of the correlations among the pages configuring four chapters included in one book 46 shown in FIG. 11A, and the observed information object ras.

Figure 12:
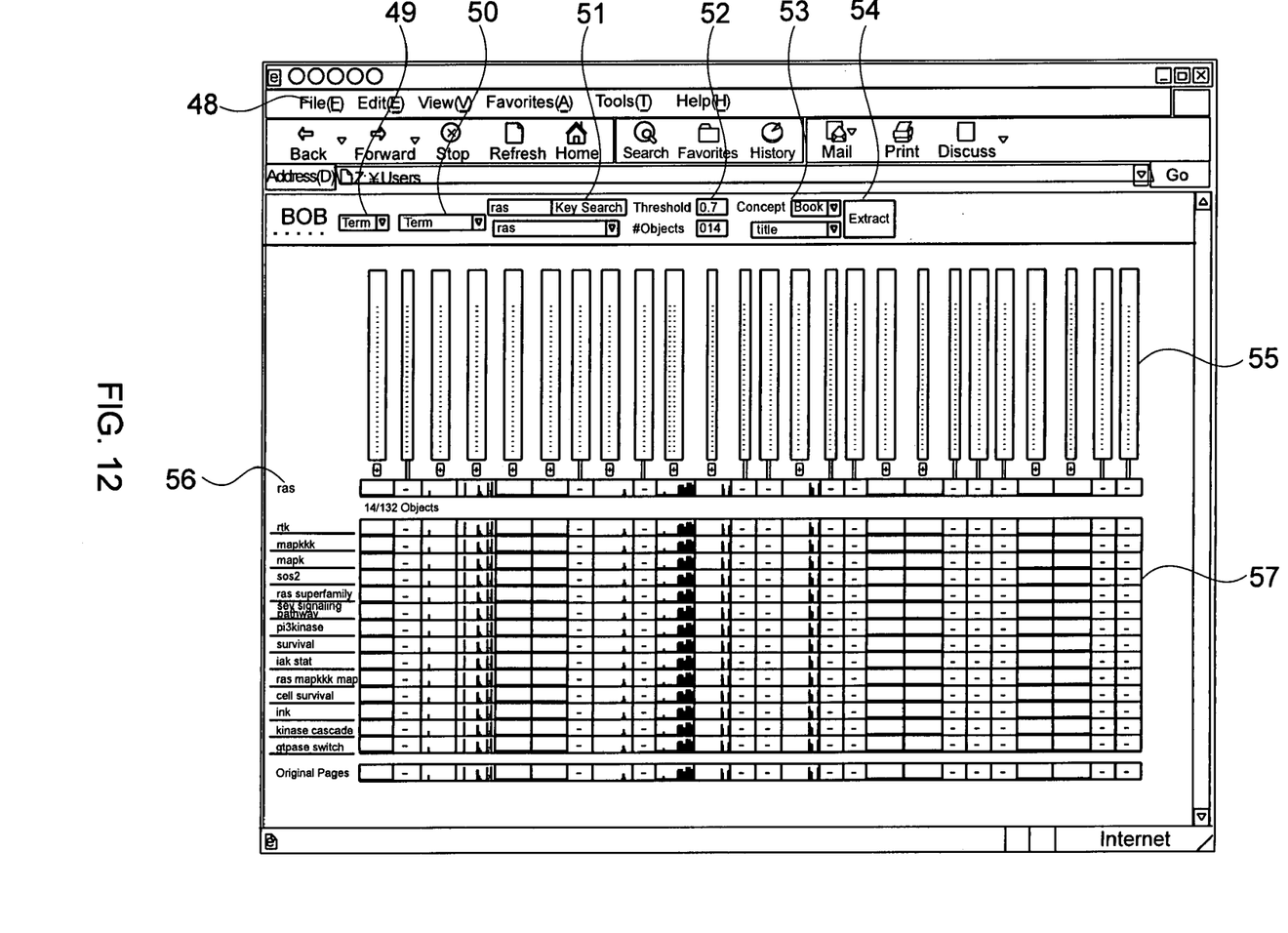
FIG. 12 illustrates an exemplary diagram showing an interface for computer software according to one embodiment.

FIG. 12 shows one example of a Web-based user interface utilizing the present invention. At the control box 48, the selection of the observed information object type 49, the selection of the information object type to be displayed in association with the observed information object 50, the input of the observed information object 51, the display conditions of the associated and displayed information objects (minimum correlation value and display characteristics) 52, and the selection of the display order of the document elements of a book or a set of a book series 53 is accomplished.

Upon clicking the execution button 54, a bar graph 56 displays the correlation between the document elements specified at 53 and the observed information object 55 specified at 51, as well as with the information object from the type specified at 50 having a high correlation with the observed information object.

With the present user interface, in the case where the observed information object is a term, when they are directly included in the text of the document elements, those elements in the graph are displayed reddened, and the correlation information related to such elements are collected and displayed 57. In this way, the associations between the information objects and the document elements can be shown.

The foregoing description of the embodiments of this invention has been presented for purposes of illustration and description. It is not intended to be exhaustive or to limit the embodiments of the invention to the form disclosed, and, obviously, many modifications and variations are possible.

What is claimed is:

1. A system for visibly processing via a computer, an information object based on observed information comprising:

a knowledge accumulation housing unit for storing electronic data representations of a plurality of known books, wherein each electronic data representation is associated with table of contents information including a plurality of titles of chapters of each associated entire book that systematizes a known content of each said entire book, wherein each electronic data representation comprises known knowledge information;

an observed information receiving unit for receiving, from a user, an information object observed by said user, wherein the information object comprises an unknown text;

a fixed quantity processing unit for:
comparing the unknown text of the information object with the known knowledge information of one of the data representations based on terms included within the text and the knowledge information, and
generating a fixed quantity value for each said chapter indicative of a correlation between the compared unknown text and the compared known knowledge information; and a fixed quantity value display processing unit for displaying the fixed quantity value and a relationship between the fixed quantity value and the table of contents information including said chapter titles, associated with the electronic data representation of the compared knowledge information in order to visually display, as a representation of the entire associated book, correlations between the known content of the associated book and the unknown information object text, wherein said visual display enables said user to use the known systematizing of the known content to interpret said unknown text.

2. The system of claim 1, further comprising:

a frequency matrix generating unit for generating a frequency matrix showing a frequency of terms included in the knowledge information; and a singular value decomposition unit for demanding a singular value coordinate system of said terms and said configuration, based on said frequency matrix, where said fixed quantity processing unit maps said terms included in said text to said singular value coordinate system, and assigns a fixed quantity to a relationship between said text and said knowledge information.

3. The system of claim 2, where said fixed quantity processing unit comprises an observed term collection unit for collecting terms included in said observed information object, depending on their weighting.

4. The system of claim 3, where said observed term collecting unit collects said terms depending on the usage frequency/importance of said terms of a mother data included in said observed information object.

5. The system of claim 3, where said fixed quantity processing unit maps said terms to positions in said singular value coordinate system depending on said weighting.

6. The system of claim 2, further comprising:

a dictionary keeping unit for keeping a term dictionary, where said frequency matrix generating unit generates said frequency matrix by extracting only terms included in said term dictionary from said knowledge information.

7. The system of claim 1, wherein the knowledge information comprises at least a portion of the table of contents information.

8. The system of claim 7, where said fixed quantity value display processing unit displays the value of the fixed quantity in accordance with said fixed quantity processing unit, along with a relationship with a desired table of contents of said table of contents information of the electronic data representation of the associated book.

9. The system of claim 1, further comprising a location retrieving unit for retrieving a configuration location of the electronic data representation of the book that relates the most to the observed information object based on the fixed quantity value.

10. The system of claim 1, further comprising a knowledge accumulation/location retrieving unit for:

evaluating a relationship between the observed information object and the electronic data representations of the plurality of books;

retrieving the electronic data representation of the book that relates the most to the observed information and a corresponding configuration location.

11. A system for visibly processing observed information comprising:

a computer readable medium having instructions stored thereon which when executed causes:

a knowledge accumulation housing unit to store electronic data representations of a plurality of known books, wherein each electronic data representation is associated with table of contents information including a plurality of titles of chapters of each associated entire book that systematizes a known content of each said entire book, wherein each electronic data representation comprises known knowledge information, an observed information receiving unit to receive, from a user, an information object observed by said user, wherein the information object comprises an unknown text, a fixed quantity processing unit to:

compare the unknown text of the information object with the known knowledge information of one of the data representations based on terms included within the text and the knowledge information, and generate a fixed quantity value for each said chapter indicative of a correlation between the compared unknown text and the compared known knowledge information, and a fixed quantity value display processing unit to display the fixed quantity value and a relationship between the fixed quantity value and the table of contents information including said chapter titles, associated with the electronic data representation of the compared knowledge information in order to visually display, as a representation of the entire associated book, correlations between the known content of the associated book and the unknown information object text, wherein said visual display enables said user to use the known systematizing of the known content to interpret said unknown text.

* * * * *